United States Patent [19]
Hartford

[11] 3,735,651
[45] May 29, 1973

[54] SHELL MACHINING APPARATUS
[75] Inventor: Lloyd Hartford, Northridge, Calif.
[73] Assignee: The Marguardt Corporation, Van Nuys, Calif.
[22] Filed: Oct. 21, 1968
[21] Appl. No.: 769,197

[52] U.S. Cl. ................................................82/15
[51] Int. Cl. ...........................................B23b 5/36
[58] Field of Search ..........................82/2.4, 15, 11; 29/27; 51/42

[56] References Cited
UNITED STATES PATENTS
1,743,116  1/1930  Cook ...................................51/42 X
1,878,628  9/1932  Foster ..................................29/27

FOREIGN PATENTS OR APPLICATIONS
859,847    12/1952  Germany ..............................82/15
1,105,686  4/1961   Germany ..............................82/2.4
929,033    6/1963   Great Britain ........................82/15

Primary Examiner—Andrew R. Juhasz
Assistant Examiner—Leon Gilden
Attorney—Robert E. Geauque

[57] ABSTRACT

A method and apparatus for producing a shell body of revolution with a substantially constant wall thickness comprising cutting both the inside and outside surface of the shell simultaneously with the cutters at a predetermined fixed spacing.

3 Claims, 1 Drawing Figure

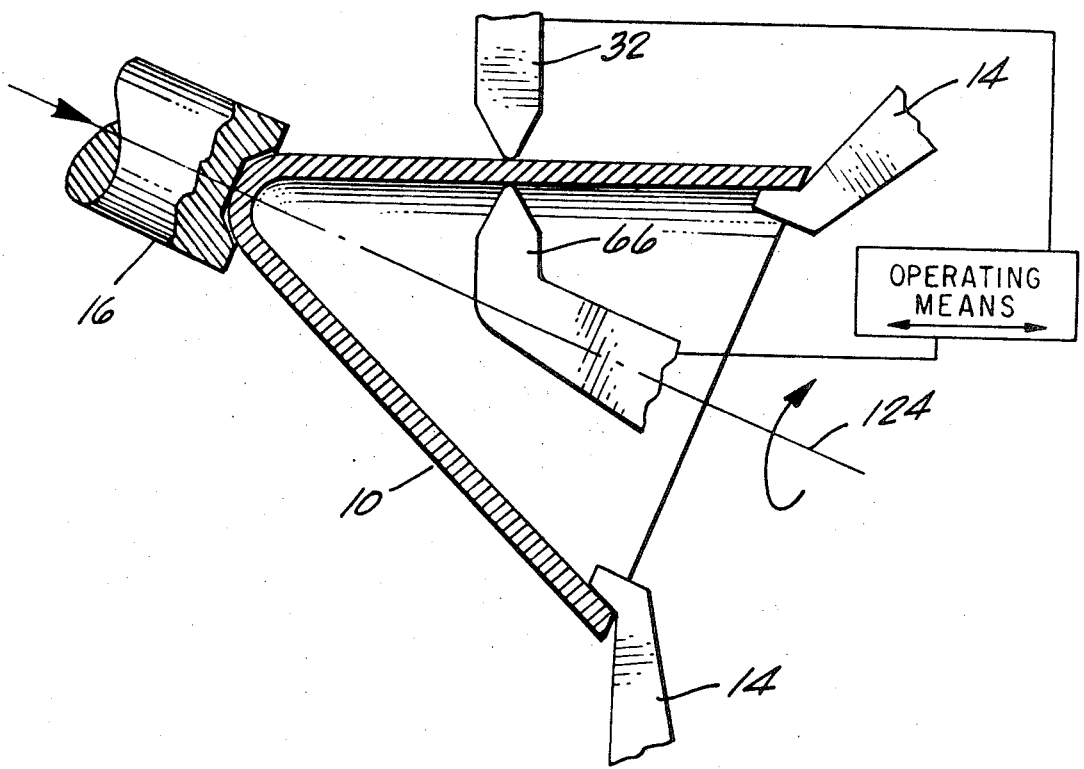

SHELL MACHINING APPARATUS

BACKGROUND OF THE INVENTION

In the design of shells made of metal, such as cylindrical members and cone-shaped members and other bodies of revolution, there is a requirement to produce the wall of the shell with small variations of wall thickness. Wall thickness variations degrade the performance of shaped charge liners. In such liners it is usually desirable to hold the wall thickness to ±0.0005 inches and the variations thereof to less than ±0.0001 inches. Such shells may be produced in rough form from sheet material on a hydraulic press or using progressive dies to draw the material into the rough shape. The current practice to machine the surface is to mount the shell on a lathe with its axis parallel to the traverse axis of the lathe. A template and tracer is used to guide the cutting tool while machining the exposed surface. Then the shell is taken out of the machine and rechecked to expose the other surface. A template and tracer is used to guide the cutting tool while machining this other surface.

There are many disadvantages to this type of machining technique. First, inaccuracies result from deflection of the shell material itself during the cutting operation. Secondly, inaccuracies result from the change in angle of the axis and center of the shell with respect to the axis of the machine when the shell is rechucked. Thirdly, inaccuracies can result from differences in settings of the templates used while cutting the two surfaces. Fourthly, inaccuracies will result from the inability of the cutting tools to follow the templates.

SUMMARY OF THE INVENTION

It has been found that the variations in wall thickness, in a plane perpendicular to the axis of the shell, resulting, from deflection of material, from change in alignment resulting from rechucking between cutting the two surfaces and from the differences in alignments of the templates used while cutting the two surfaces, can all be eliminated by cutting both the inner and outer surfaces of the shell simultaneously with opposing cutters which are held rigidly with respect to each other.

For cutting conical surfaces, the variations in wall thickness along the slant height, resulting from the use of a template and tracer, can be eliminated by setting the axis of the workpiece holder at the half-angle of the cone with respect to the direction of traverse of the cutting tools instead of using a template and tracer.

To accomplish the above objectives an apparatus has been designed to effect machining of both the inner and outer surfaces simultaneously of a cone-shaped shell. Opposed cutters are rigidly mounted, the first cutter operating on the outer surface of the shell and the second cutter operating on the inner surface of the shell. The cutters are designed to move in a lineal direction while performing the cutting operations. To accomplish the machining technique of this invention the cone-shaped shell is mounted so that the base of the cone is held securely by a chuck element. The cone axis is mounted at one-half the angle of the cone with respect to the traverse axis upon which the cutters are moved.

The chuck member is designed to rotate and effect rotating of the shell. As the chuck rotates, the shell rotates and the cutters feed along a straight line element of the cone. As both surfaces are being operated upon simultaneously, the deflection of the cone surface due to the contacting of a single cutter upon a surface is eliminated. The result is that, as both the interior and exterior surfaces are being cut simultaneously, wall thickness variance is only due to the tool wear.

Other advantages of this invention, not specifically enumerated above, are believed to become apparent as the description of this invention proceeds.

BRIEF DESCRIPTION OF THE DRAWING

The FIGURE is a schematic, partly in section, view showing in detail the workpiece holding assembly and the opposed cutter arrangement of this invention.

DETAILED DESCRIPTION OF THE SHOWN EMBODIMENT

Referring particularly to the drawing, there is shown a workpiece 10 which is supportingly held by a spindle chuck assembly 14. A live center 16 is adapted to matingly cooperate with the nose portion of the workpiece 10. Live center 16 is being constantly pressed against workpiece 10 by a hydraulic actuator (not shown). Spindle chuck assembly 14 is adapted to rotate which in turn causes rotation of the workpiece 10. Live center 16 is mounted on bearings (not shown) to also rotate with the workpiece 10.

An outside cutter 32 is adapted to contact the exterior surface of workpiece 10. The cutter 32 is adjustable in a perpendicular direction from the surface of the workpiece 10, yet once positioned, can be rigidly held in that position. The rigid mounting of the cutter 32 is necessary to insure accurate machining of the workpiece 10.

An inside cutter 66 is so positioned as to be in line with the outside cutter 32 but adapted to contact the interior surface of workpiece 10. Cutter 66 is adjustable in the same manner as cutter 32 and also capable of being rigidly held once positioned. Cutter 66 is located and removed from the cutting position by a device (not shown) which moves the cutter 66 along axis 124. However, it is not necessary to move the cutter 66 only along axis 124. However, the movement must be sufficiently offset to not contact elements 14.

The operation of the apparatus of this invention is as follows: Prior to installation of the workpiece 10, chuck assembly 14 and the live center 16 are located in an in-line relationship to hold the workpiece 10. The in-line relationship is established to be one-half of the cone angle of the workpiece 10. The cone-shaped workpiece 10 is then installed so that the chuck assembly 14 holds the base thereof and the live center 16 pushes against the nose portion of the workpiece. With the workpiece 10 so installed the cutters 32 and 66 are positioned with respect to the center line of the workpiece surface to give the desired cutting depth. Upon activation of the cutting operation the workpiece 10 is rotated about the axis 124 which also is the center line of the cone shaped workpiece 10. The cutters 32 and 66 are moved during the cutting operation in a lineal direction which is at an angle from axis 124 which is equal to one-half the cone angle. This cutting direction must be so established to cause the cutters 32 and 66 to move equidistantly and parallel to the center line of the shell wall at the cutters 32 and 66 line of contact.

It is to be understood, therefore, that numerous modifications and variations of the present invention are possible in the light of the above teachings, as will be readily apparent to those versed in the art without departing from the spirit and scope of the present invention as set forth in the appending claims.

I claim

1. An apparatus for cutting both the inner and outer surfaces simultaneously of a cone-shaped shell comprising:

a chuck assembly for rotatingly supporting said shell;

first and second cutters being mounted in a facing relationship with said shell surfaces, said cutters being rigidly mounted with a fixed gap therebetween, the cutting tips being in substantial alignment and substantially perpendicular to the surface of said shell;

said shell being mounted at one-half its cone angle with respect to the direction of cutter movement; and operating means for simultaneously moving said cutters along the surfaces of said shell.

2. An apparatus as defined in claim 1 wherein:

said cutting means includes first and second cutters being mounted in a facing relationship with each other with the wall of said shell located therebetween, said first and second cutters located in substantial alignment with each other and substantially perpendicular to said lineal direction.

3. An apparatus as defined in claim 2 wherein:

said operating means simultaneously moves said first and second cutters during the cutting operation.

* * * * *